United States Patent [19]

Brown

[11] Patent Number: 4,770,497
[45] Date of Patent: Sep. 13, 1988

[54] KINEMATIC MOUNT FOR HEAVY OPTICS

[75] Inventor: Donald G. Brown, Newbury Park, Calif.

[73] Assignee: Rockwell International Corporation, El Segundo, Calif.

[21] Appl. No.: 846,422

[22] Filed: Mar. 31, 1986

[51] Int. Cl.$^4$ ............................................. G02B 7/00
[52] U.S. Cl. .................................. 350/321; 350/252; 350/634
[58] Field of Search ............... 350/321, 247, 252, 253, 350/255, 257, 245, 636, 632–634; 248/481, 603

[56] References Cited

U.S. PATENT DOCUMENTS

| | | | |
|---|---|---|---|
| 3,424,413 | 1/1969 | Applegate | 350/634 |
| 4,088,396 | 5/1978 | Edelstein | 350/252 |
| 4,268,123 | 5/1981 | Mesco | 350/310 |
| 4,331,384 | 5/1982 | Eisler | 350/321 |

OTHER PUBLICATIONS

Newport Corporation 1983–84 Catalog, Fountain Valley, Calif., p. 104.

Primary Examiner—John K. Corbin
Assistant Examiner—Loha Ben
Attorney, Agent, or Firm—H. Fredrick Hamann; Harry B. Field; Lawrence N. Ginsberg

[57] ABSTRACT

An apparatus 30 for kinematically mounting an optic 32, requiring more than three point support, to a structure 38. A holder 34 fixedly contains the optic 32. A ball 44, socket 46 and fastener 50 provide sole support of the optic 32 in three of the six degrees of freedom necessary for complete support. A ball 54, socket 56 and fastener 60 provide sole support of the optic 32 in two of the remaining three degrees of freedom. Two Belleville disc springs 64, a thrust washer 66, thrust bearing 68, one-half ball 70 and fastener 72 support the optic 32 on the structure 38 in the final degree of freedom without introducing redundancy in that final degree of freedom. By providing the capability of having numerous resilient support assemblies supporting the optic 32 in the final degree of freedom without introducing redundancy, heavy optics can be supported with very little structural or thermal distortions.

10 Claims, 3 Drawing Sheets

KINEMATIC MOUNT FOR HEAVY OPTICS

BACKGROUND OF THE INVENTION

The present invention relates to optical mounting systems, and more specifically to kinematic mounts for large, heavily loaded optics.

Due to the accuracy usually required in the mounting of precision optical systems, kinematic principles are often found to be necessary. A body in space has six degrees of freedom (i.e. ways in which it can move). These are: translation along the three rectangular coordinate axes, and rotation about those three axes.

A body is fully constrained when each of these possible movements is individually prevented from occurring. If a movement in any particular degree of freedom is prevented by more than one mechanism, then a body is overconstrained, and its support system becomes redundant. All but one of the constraints will be ineffective, or the body will be deformed by the multiple constraint, and loads will be indeterminate. Typical mounting systems that are not sensitive to these deformations usually use a redundant configuration for simplicity and low cost. A mount that satisfies the requirement of fixing all degrees of freedom without redundant constraint is termed "kinematic", and a good optical mount will always employ some version of it. Use of a kinematic mounting system also results in relative insensitivity to thermal differential distortions and manufacturing tolerances, and provides greater positioning control.

OBJECTS OF THE INVENTION

A principle object of the invention, therefore, is to provide a kinematic mount for large, heavy optics which require more than the usual three points of suspension.

Another object is to provide a lightweight mount which is more stable than conventional mounts and has lower distortion.

Another object is to maintain the mounting inner face insensitive to manufacturing tolerances and thermal distortion.

Yet another object is to provide accurate vibration and position control at the mounting inner face.

Other objects, advantages and novel features of the present invention will become apparent from the following detailed description of the invention when considered in conjunction with the accompanying drawing.

SUMMARY OF THE INVENTION

The present invention is an apparatus for kinematically mounting an optic, that requires more than three point support, to a structure. In its broadest aspects, the invention comprises a holder, a ball and socket attachment assembly, a ball and slot attachment assembly, and a plurality of resilient support assemblies. The holder fixedly contains the optic. The ball and socket attachment assembly provides sole support of the optic on the structure in three of the six degrees of freedom necessary for complete support. The ball and slot attachment assembly provides sole support of the optic on the structure in two degrees of the remaining three degrees of freedom. Each of a plurality of resilient support assemblies support the optic on the structure in the final degree of freedom without introducing redundancy in that final degree of freedom. By providing the capability of having numerous resilient support assemblies supporting the optic in the final degree of freedom without introducing redundancy, heavy mounts can be supported kinematically, thereby providing lightweight stable mountings with very little structural and thermal distortion.

In the preferred embodiment, each resilient support assembly consists of, in the following order, a flat bearing, a thrust washer, two Belleville disc springs in series, and a one-half ball. These components are fixedly sandwiched between the structure and a socket located on the holder by means of a fastener extending through each component which, on one end, attaches to the holder and on another end attaches to the structure. The flat bearing permits motion of the holder relative to the structure on two orthogonal axes. The Belleville springs permit flexibility in the motion of the holder in the direction of a third axis which is perpendicular to the above axes. The one-half ball permits rotational flexibility of the holder about two of the axes. However, this resilient support assembly, in conjunction with the ball and socket attachment assembly and the ball and slot attachment assembly, prevents rotation of the holder about one of the axes. Each resilient support assembly therefore supports the optics on the structure in the final degree of freedom without introducing redundancy in the final degree of freedom no matter how many resilient support assemblies must be utilized thereby preventing distortions.

The invention will be more clearly understood by reference to the detailed description, which follows, taken in connection with the accompanying drawings.

DETAILED DESCRIPTION OF THE INVENTION

Figure 1:
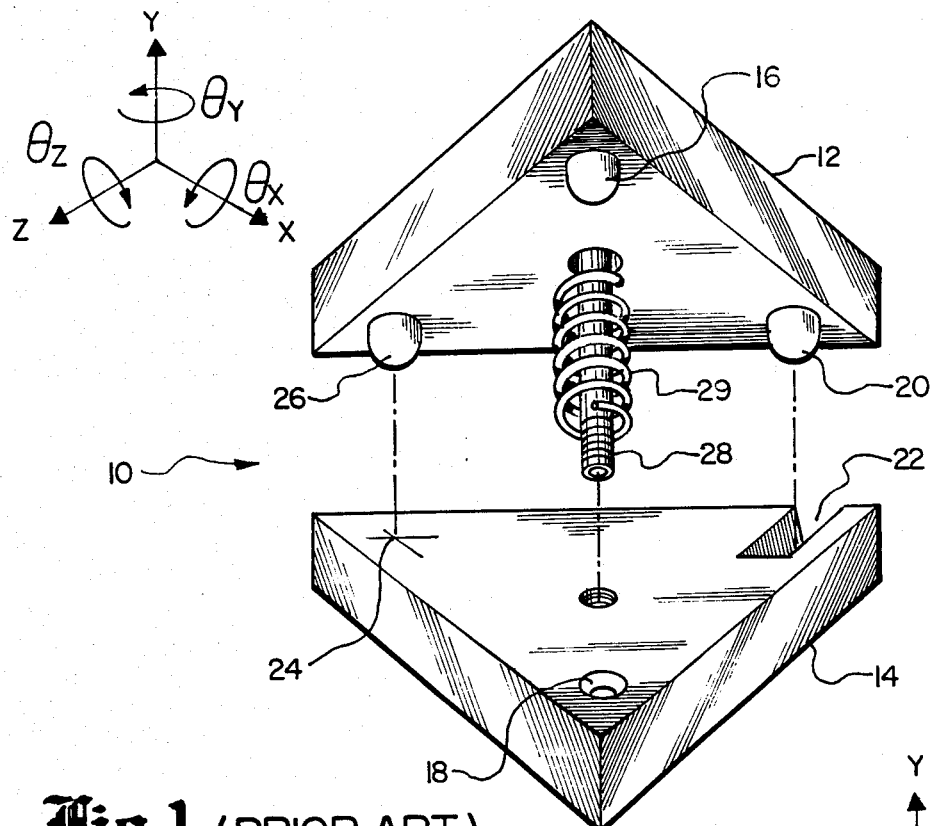
FIG. 1 is an exploded schematic view of a prior art kinematic mount.

An example of a typical prior art kinematic mounting system 10 is shown in FIG. 1. Mounting system 10 is comprised of upper plate 12 and lower plate 14. A ball ended rod 16 which extends from upper plate 12 fits into a socket-cup 18 and restrains the two plates in the three translational degrees of freedom, i.e. translation along the x, y, and z axes. Another ball ended rod 20 mates with V-groove 22 in lower plate 14 to eliminate two rotations. The rotations eliminated are that about a vertical axis of socket-cup 18 and that about an axis extending between socket-cup 18 and point 24 (i.e., $\theta_y$ and $\theta_x$, respectively). Point 24 contacts a third ball ended rod 26. The contact between rod 26 and plate 14 at point 24 eliminates the final rotation, about an axis extending between socket-cup 18 and V-groove 22 (i.e. $\theta_z$). The assembly is held together by a loose fitting bolt 28 and spring 29. The two plates are mounted together without any redundant constraints, and all loads are determinate.

The kinematic system described above is readily applicable for small optical components. However, it is not available for large optics for the following reasons:

Constraint of the final rotational degree of freedom, $\theta_z$, is commonly done at one point with a ball and point contact. This regulates the support system to three discrete points. For large, heavily loaded optics, three points are sometimes insufficient due to the distortion potential between three widely spaced points. This is especially true with large optics that must be sealed against pressure loads.

The conventional kinematic mounts utilize some form of bolt and spring attachment, i.e. bolt 28, spring 29, which is separate from the three main support points. This attachment holds the mount halves together, and is most conveniently located in the center. Unfortunately, this precludes use of the mount for transmissive optics.

Large, heavy mounts, with only three points of support, have large loads at each point. Since the kinematic mechanism depends on very limited contact area, these large loads will result in excessively high contact stresses. The three areas of contact are: a circle with the ball and cup, two points with the ball and slot, and one point with the ball and pad. Unit stresses at these points can easily become too high to be practical.

Figure 2:
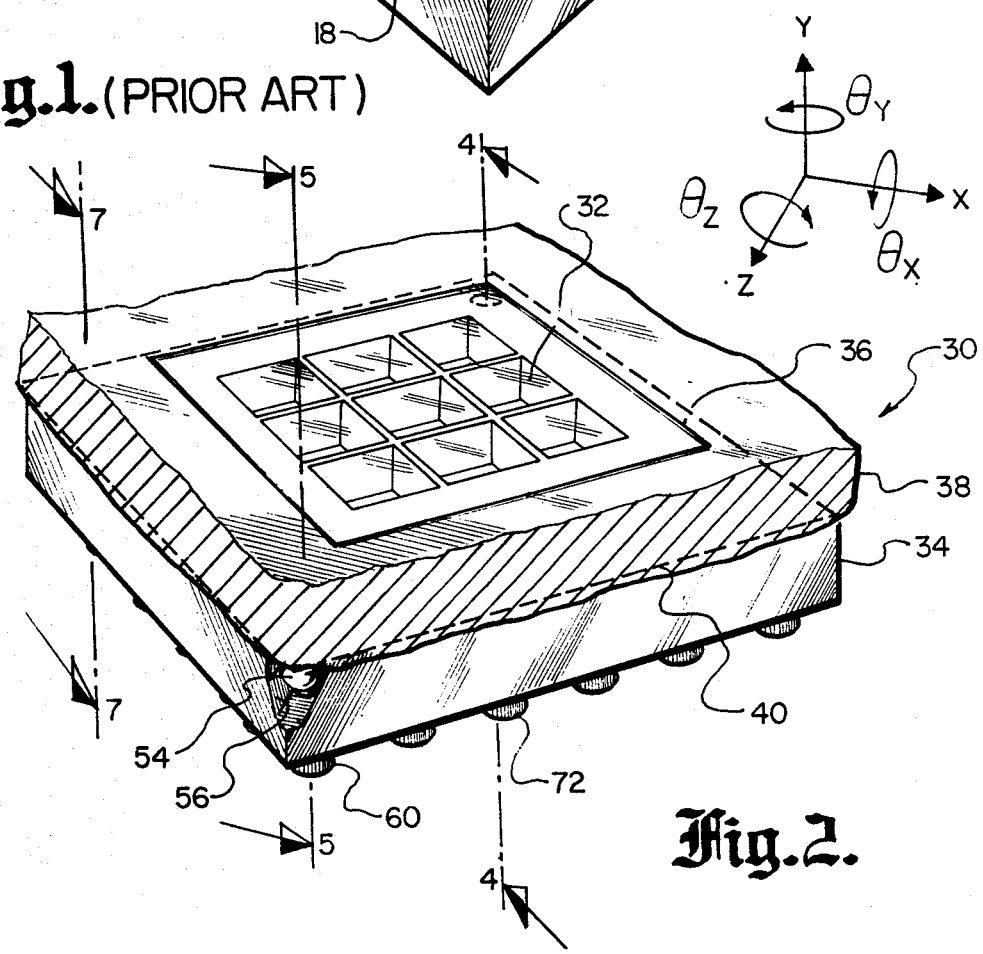
FIG. 2 is a perspective view of the kinematic mount of the present invention.
Figure 3:
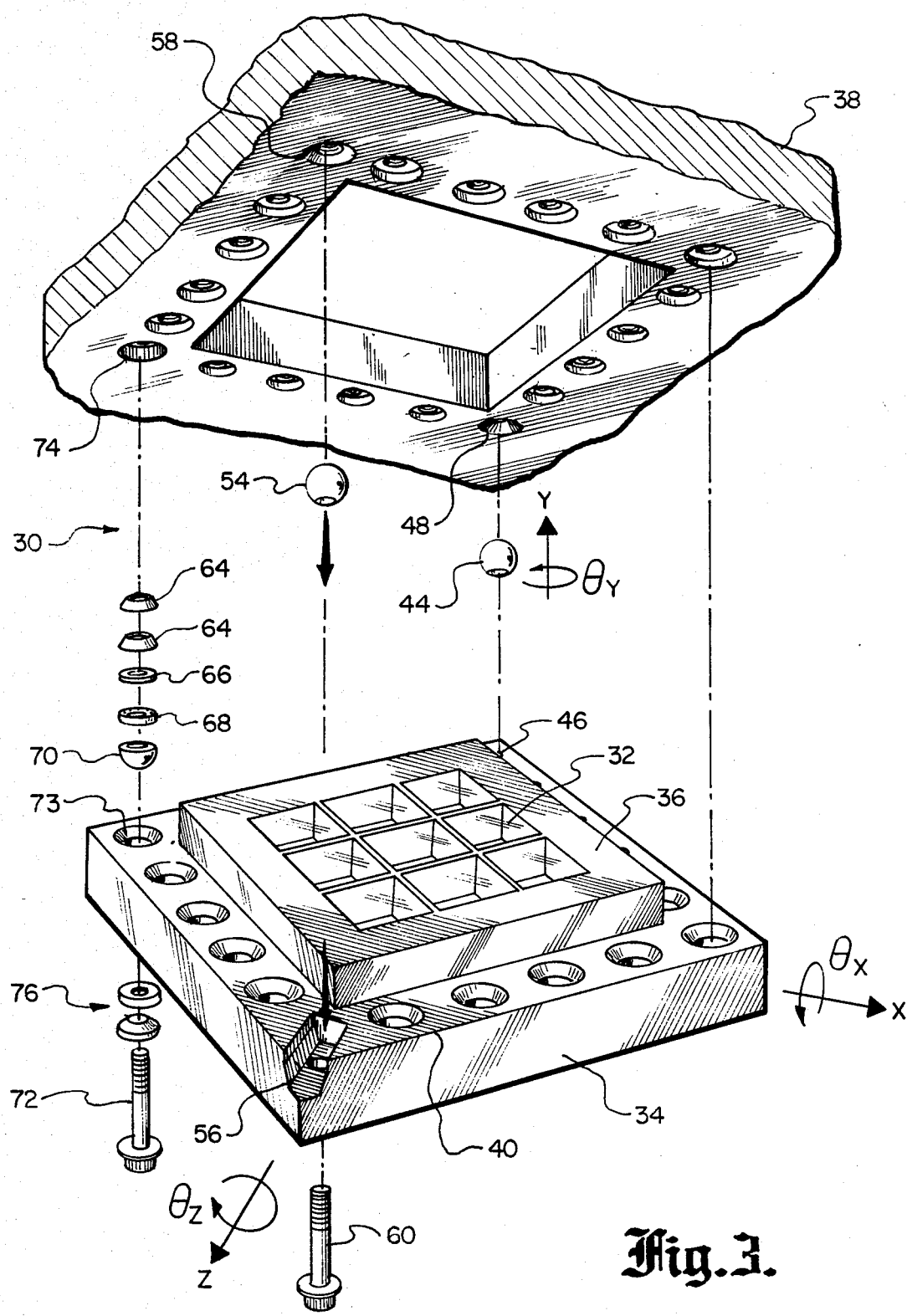
FIG. 3 is an exploded view of FIG. 2.

The present invention, designated generally as 30 in FIGS. 2 and 3, overcomes these deficiencies while still utilizing kinematic mounting principles. The optic 32 desired to be mounted is fixedly supported in a holder 34. The optic 32 shown in this Figure is a segmented window; however, the mount of the present invention can be used with lenses, mirrors, and various other types of optics. The invention is particularly well adapted for heavy optics, i.e., those weighing over 25 pounds. These heavy optics require more than three point supports.

The optic 32 is shown fixedly contained within the walls of the machined extension 36 of the holder 34. The optic 32 may, for example, be attached to the holder 34 by an elastomeric support.

Figure 4:
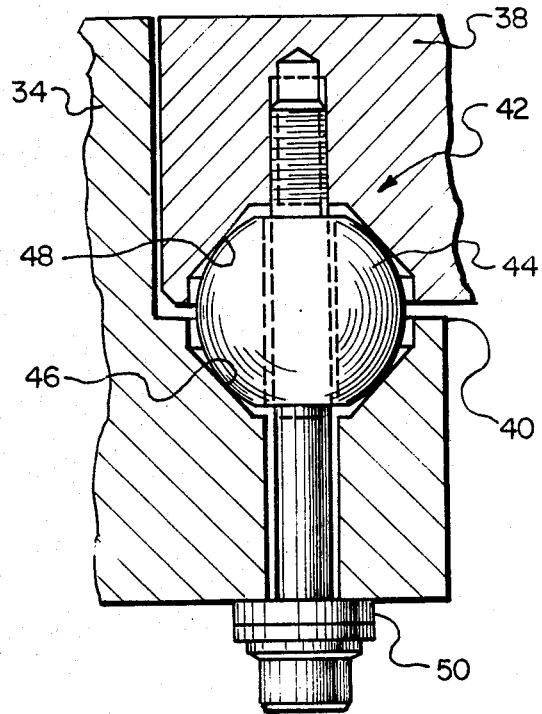
FIG. 4 is a cross-sectional view of a ball and socket attachment assembly taken along line 4—4 of FIG. 2.

The holder 34 attaches to a structure 38 such as a support frame by means of a plurality of attachment-/support assemblies adjacent to the periphery 40 of the holder 34. A single ball and socket attachment assembly 42 shown in detail in FIG. 4 includes a ball 44 which fits in a socket 46 adjacent periphery 40 and in a socket 48 on structure 38. The ball 44 has a central hole. A bolt 50 or other fastener fits within the central hole and interconnects the holder 34, structure 38, and ball 44. This interconnection provides sole support of the optic 32 in three of the six degrees of freedom necessary for complete support. These three degrees of freedom supported are the three translational degrees of freedom, i.e., translations along the x, y and z axes. (The x and z axes are parallel to the surface of the holder at 90° to each other. The y axis extends perpendicular to both the x and z axes.)

Figure 5:
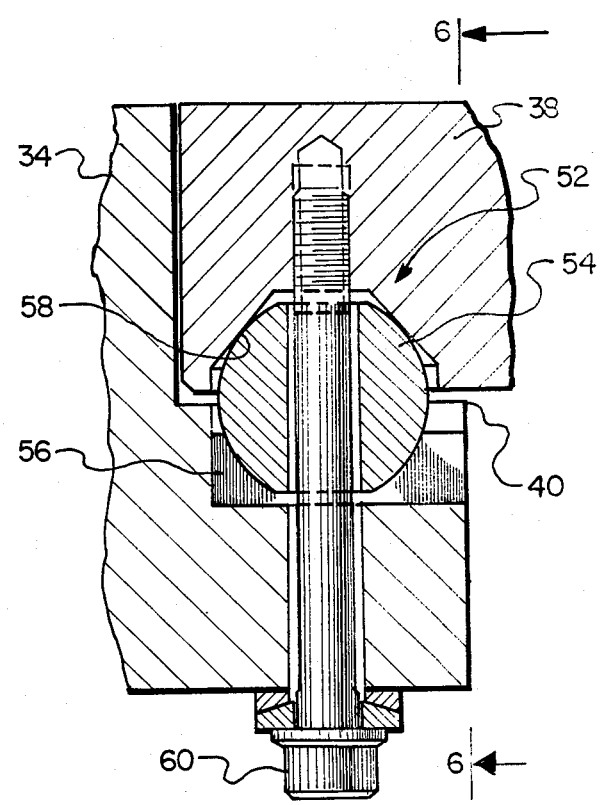
FIG. 5 is a cross-sectional view of a ball and slot attachment assembly taken along line 5—5 of FIG. 2.
Figure 6:
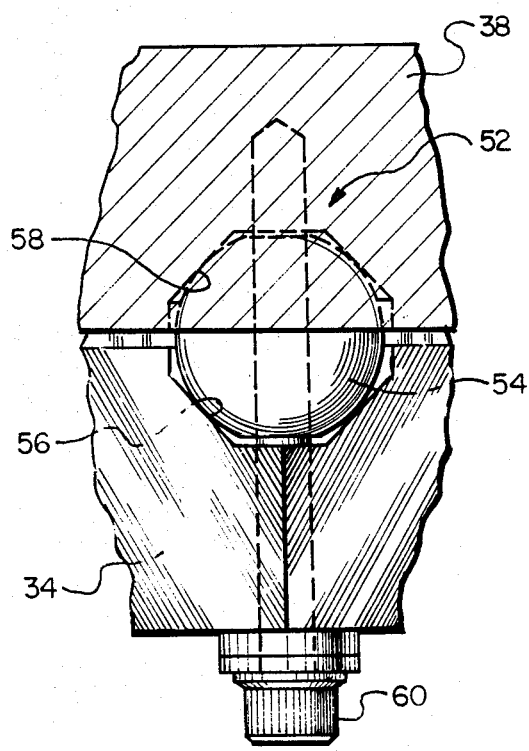
FIG. 6 is a cross-sectional view of a ball and slot attachment assembly taken along line 6—6 of FIG. 5.

A single ball and slot attachment assembly 52 shown in detail in FIGS. 5 and 6 includes a ball 54 which fits into a slot 56 adjacent periphery 40 and in a socket 58 in structure 38. As in the ball and socket assembly 42, the ball has a hole therethrough for fitting a bolt 60. The resulting interconnection provides sole support of optic 32 in two of the remaining three degrees of freedom. These two degrees of freedom supported are two rotational degrees of freedom, i.e. rotation about the x axis and rotation about the y axis ($\theta_x$ and $\theta_y$, respectively).

The invention contains a plurality of resilient support assemblies 62 arranged adjacent periphery 40. Each resilient support assembly 62 comprises a pair of Belleville disc springs 64, a thrust washer 66, a thrust bearing 68, and a one-half ball 70. Each component of this assembly has an opening for emplacement of a bolt 72 for securing the assembly 62 to a socket 73 in the holder 34 and a seat 74 in structure 38.

The resilient support assemblies 62 support the optic 32 on the structure 38 in the final degree of freedom, $\theta_z$, without introducing redundancy in this final degree of freedom. The thrust bearing 68 permits motion of the holder 34 relative to the structure 38 along the x and z axes. The Belleville disc springs 64 permit flexibility in the motion of the holder 34 in the direction of the y axis and also provide complete damping control of natural frequency levels with their wide range of spring rate options. The one-half ball 70 permits rotational flexibility of the holder 34 about the x and y axes. This invention allows any number of resilient support assemblies 62 to be used without constraining any of the degrees of freedom except for the rotational degree of freedom around the z axis. Therefore, individual contact loads and resultant deflections may be reduced to acceptable levels by increasing the number of resilient support assemblies to whatever is required. The ball and slot assembly 52 and the ball and socket assembly 42 fix the remaining five degrees of freedom. The support/attachment assemblies are equally spaced in the numbers necessary to provide sufficient support based on the particular loading condition.

Placement of the fasteners 50, 60, and 72 through the center of each assembly 42, 52, 62 provides room necessary to allow this design to reach its full potential and keeps the size of the mount within that of conventional nonkinematic mounts. Each fastener is provided with a spherical washer assembly 76 to preclude induced moments. Each combination kinematic socket-fastener can be easily located wherever necessary so as to provide full aperture transmissive optics.

Figure 7:
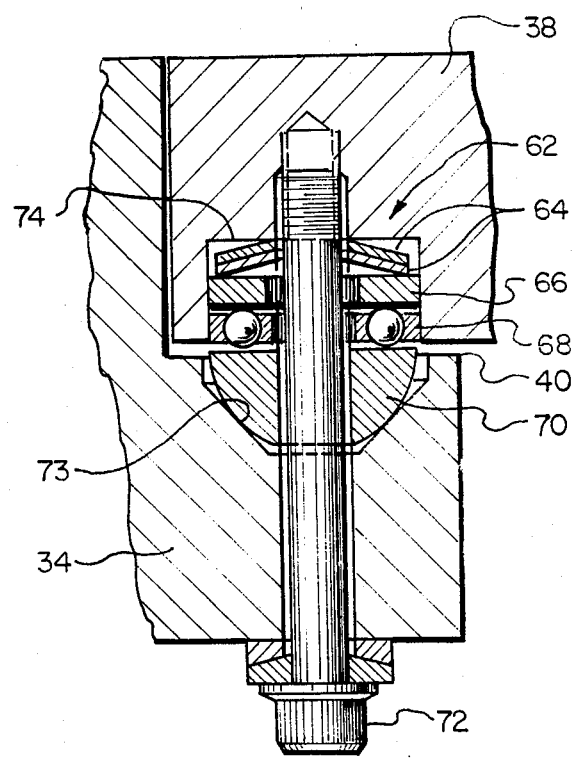
FIG. 7 is a cross-sectional view of a resilient support assembly taken along line 7—7 of FIG. 2.

Obviously, many modifications and variations of the present invention are possible in light of the above teachings. For example, although in FIGS. 3 and 7 the fastener is oriented with its head adjacent the holder 34, its direction is not critical and it, instead, could be oriented with its head adjacent the structure 38. It is also noted that instead of Belleville disc springs that other springs such as coil springs, leaf springs or other flexible members may be utilized.

Accordingly, it should be understood that, within the scope of the appended claims, the invention may be practiced otherwise than as specifically illustrated and described.

I claim:

1. An apparatus for kinematically mounting an optic in six degrees of freedom necessary for complete support, said optic requiring more than three point support on a structure, comprising:

a holder for fixedly containing said optic, said holder having an outer periphery;

ball and socket means engageable with a first portion of the holder adjacent said periphery and with said structure, said ball and socket means providing sole support of said optic on said structure in three of the six degrees of freedom necessary for complete support;

ball and slot means engageable with a second portion of the holder adjacent said periphery and with said structure, said ball and slot means providing sole support of said optic on said structure in two of the remaining three degrees of freedom; and a plurality of resilient support means engageable with a plurality of other portions of the holder adjacent said periphery and also engageable with said structure, said resilient support means for supporting said optic on said structure in the final degree of freedom without introducing redundancy in said final degree of freedom.

2. The apparatus of claim 1, wherein said holder has a substantially flat surface with a first and second imaginary axis extending parallel to the flat surface at 90° and a third imaginary axis extending perpendicular to the first and second axes, each of said resilient support means including:

bearing means, permitting motion of said holder relative to said structure along said first and second axes;

spring means, connected to said bearing means for permitting flexibility in the motion of said holder in the direction of said third axis; and ball means, connected to said bearing means, for permitting rotational flexibility of said holder about said first and third axes wherein said resilient support means, in conjunction with said ball and socket means and said ball and slot means, prevents rotation of said holder about said second axis.

3. The apparatus of claim 2, wherein:

said bearing means includes a flat bearing located adjacent a thrust washer.

4. The apparatus of claim 3 wherein said spring means includes two Belleville disc springs arranged in series with respect to each other.

5. The apparatus of claim 4 wherein said ball means includes a one-half ball.

6. The apparatus of claim 5 wherein said Belleville disc springs are located adjacent said holder, said one-half ball is located adjacent said structure, and said thrust bearing and thrust washer are located between said one-half ball and said Belleville disc springs, respectively, each of these components having a central hole therethrough for insertion of a fastener for fastening said resilient support means to said holder and to said structure.

7. The apparatus of claim 6, wherein said ball and socket means includes a single ball and two sockets, one socket located on the holder adjacent said periphery and the other socket located on said structure, said ball and socket means further including means for fastening said ball to said sockets.

8. The apparatus of claim 7, wherein said ball and socket fastening means includes a bolt extending through holes in each of the sockets in the ball and socket means and extending through a hole within the ball of the ball and socket means.

9. The apparatus of claim 8, wherein said ball and slot means includes another single ball, a slot located on the holder adjacent said periphery, and a socket located on said structure, said ball and slot means further including means for fastening said ball to said slot and socket.

10. The apparatus of claim 9, wherein said ball and slot fastening means includes a bolt extending through holes in each of said slot, socket, and ball in the ball and slot means and extending through a hole within the ball of the ball and slot means.

* * * * *